US009141686B2

(12) United States Patent
Kern et al.

(10) Patent No.: US 9,141,686 B2
(45) Date of Patent: Sep. 22, 2015

(54) RISK ANALYSIS USING UNSTRUCTURED DATA

(71) Applicant: Bank of America Corporation, Charlotte, NC (US)

(72) Inventors: Daniel C. Kern, Charlotte, NC (US); David A. Hogeboom, Davidson, NC (US); Anne Bromstead, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 91 days.

(21) Appl. No.: 13/672,012

(22) Filed: Nov. 8, 2012

(65) Prior Publication Data

US 2014/0129561 A1    May 8, 2014

(51) Int. Cl.
*G06F 17/30* (2006.01)

(52) U.S. Cl.
CPC ................. *G06F 17/30598* (2013.01)

(58) Field of Classification Search
CPC .............. G06F 17/30707; G06F 17/30595; G06F 17/3061
USPC ............. 707/101, 102, 600, 719, 5, 1/1, 748, 707/708; 705/2
See application file for complete search history.

(56) References Cited

U.S. PATENT DOCUMENTS

| | | | |
|---|---|---|---|
| 6,523,026 B1 * | 2/2003 | Gillis | 1/1 |
| 6,629,097 B1 * | 9/2003 | Keith | 1/1 |
| 7,373,274 B2 | 5/2008 | Kunce | |
| 7,441,197 B2 | 10/2008 | Tschiegg et al. | |
| 7,536,405 B2 | 5/2009 | Tschiegg et al. | |
| 7,809,595 B2 | 10/2010 | Breslin et al. | |
| 7,873,567 B2 | 1/2011 | Eder | |
| 8,135,638 B2 | 3/2012 | Gopfert et al. | |
| 2002/0077821 A1 * | 6/2002 | Case et al. | 704/260 |
| 2003/0046203 A1 | 3/2003 | Ichihari et al. | |
| 2003/0065613 A1 | 4/2003 | Smith | |
| 2005/0065807 A1 | 3/2005 | DeAngelis et al. | |
| 2005/0197952 A1 | 9/2005 | Shea et al. | |
| 2005/0278362 A1 * | 12/2005 | Maren et al. | 707/100 |
| 2006/0100958 A1 | 5/2006 | Cheng et al. | |
| 2006/0155553 A1 | 7/2006 | Brohman et al. | |
| 2006/0224500 A1 | 10/2006 | Stane et al. | |
| 2006/0277205 A1 * | 12/2006 | Song et al. | 707/102 |
| 2008/0154679 A1 | 6/2008 | Wade | |
| 2008/0154873 A1 * | 6/2008 | Redlich et al. | 707/5 |
| 2008/0221944 A1 | 9/2008 | Kelly et al. | |
| 2009/0043637 A1 | 2/2009 | Eder | |
| 2009/0043797 A1 * | 2/2009 | Dorie et al. | 707/101 |
| 2010/0324927 A1 * | 12/2010 | Tinsley | 705/2 |

(Continued)

FOREIGN PATENT DOCUMENTS

WO    WO 2006/071900 A2    7/2006

*Primary Examiner* — Mariela Reyes
*Assistant Examiner* — Thong Vu
(74) *Attorney, Agent, or Firm* — Michael A. Springs

(57) ABSTRACT

Unstructured data is received from a plurality of sources to facilitate risk analysis. The unstructured data comprises a plurality of bodies of text. Each body of text from the unstructured data is deconstructed into individual terms. The individual terms from each body of text are converted into a structured form. The individual terms in the structured form are categorized according to a comparison of the structured form to another structured form. The individual terms in the structured form are quantified according to at least the categorization of the individual terms.

19 Claims, 2 Drawing Sheets

(56) References Cited

U.S. PATENT DOCUMENTS

| | | | |
|---|---|---|---|
| 2011/0072052 A1* | 3/2011 | Skarin et al. | 707/794 |
| 2011/0179009 A1* | 7/2011 | Nam | 707/708 |
| 2011/0184935 A1* | 7/2011 | Marlin | 707/719 |
| 2011/0231382 A1* | 9/2011 | Xu | 707/706 |
| 2012/0072247 A1 | 3/2012 | Rosauer et al. | |
| 2012/0221485 A1 | 8/2012 | Leidner et al. | |
| 2012/0278336 A1* | 11/2012 | Malik et al. | 707/748 |
| 2013/0246334 A1* | 9/2013 | Ahuja et al. | 707/600 |

* cited by examiner

RISK ANALYSIS USING UNSTRUCTURED DATA

TECHNICAL FIELD OF THE INVENTION

This invention relates generally to risk analysis, and more particularly to risk analysis using unstructured data.

BACKGROUND OF THE INVENTION

Information about risks an organization faces or could face is documented in a variety of systems and sources. This information usually contains unstructured information (i.e., bodies of text) and is not typically easy to quantify and automatically analyze. The information is typically written to allow readers to understand the intended message. While a reader may read small bodies of separate texts, it is impracticable for a reader to read and summarize many bodies of text in a reasonable amount of time.

SUMMARY OF THE INVENTION

According to embodiments of the present disclosure, disadvantages and problems associated with analyzing risk using unstructured data may be reduced or eliminated.

In certain embodiments, unstructured data is received from a plurality of sources to facilitate risk analysis. The unstructured data comprises a plurality of bodies of text. Each body of text from the unstructured data is deconstructed into individual terms. The individual terms from each body of text are converted into a structured form. The individual terms in the structured form are categorized according to a comparison of the structured form to another structured form. The individual terms in the structured form are quantified according to at least the categorization of the individual terms.

Certain embodiments of the present disclosure may provide one or more technical advantages. A technical advantage of one embodiment includes extracting, analyzing, and summarizing useful information from various, unstructured sources to manage operational risks. Another technical advantage of an embodiment includes transforming unstructured data into a structured form to determine risk. Yet another technical advantage of an embodiment includes identifying and aggregating risks across an organization to manage.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
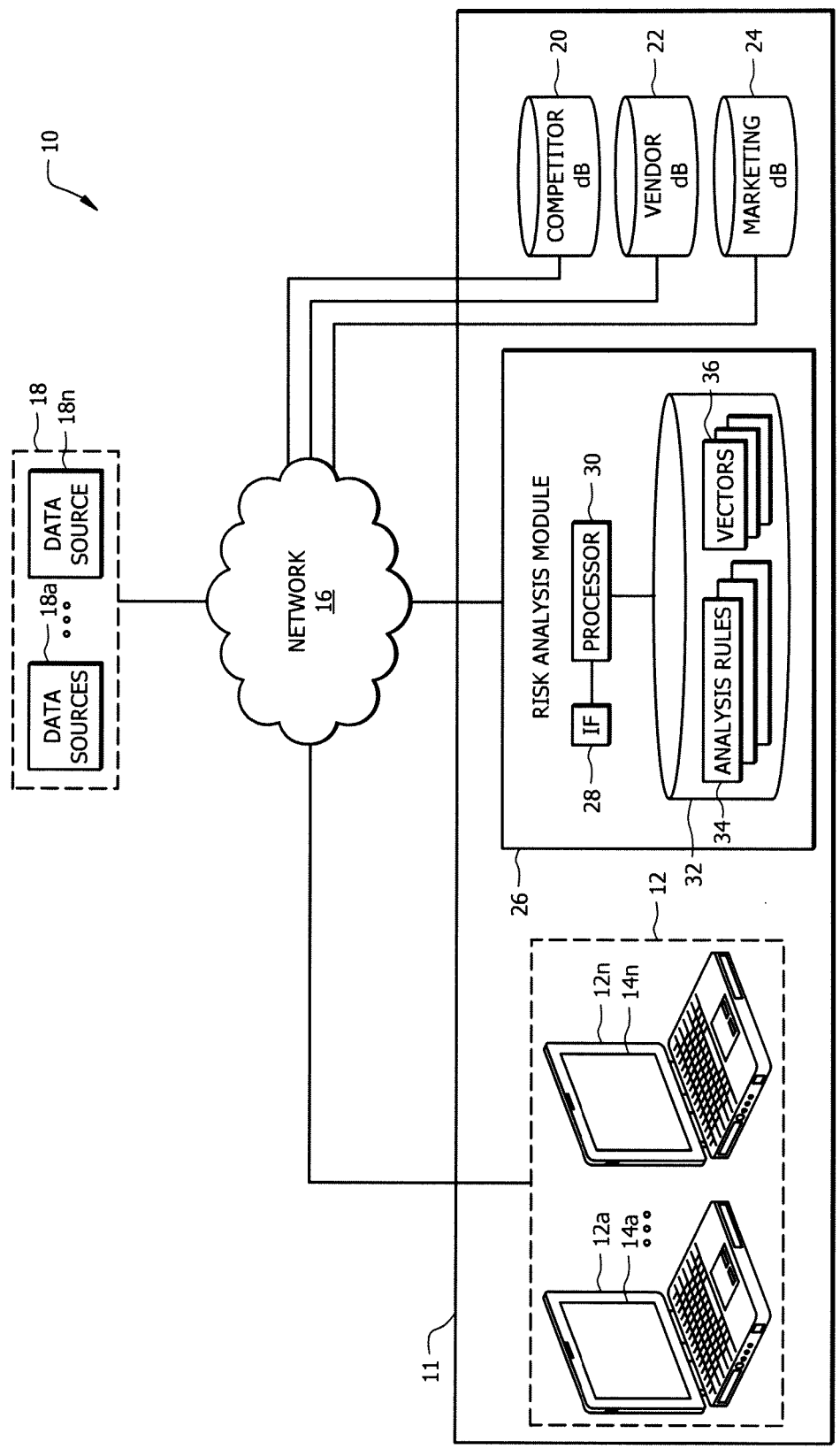
FIG. 1 illustrates a block diagram of a system for analyzing risk using unstructured data.
Figure 2:
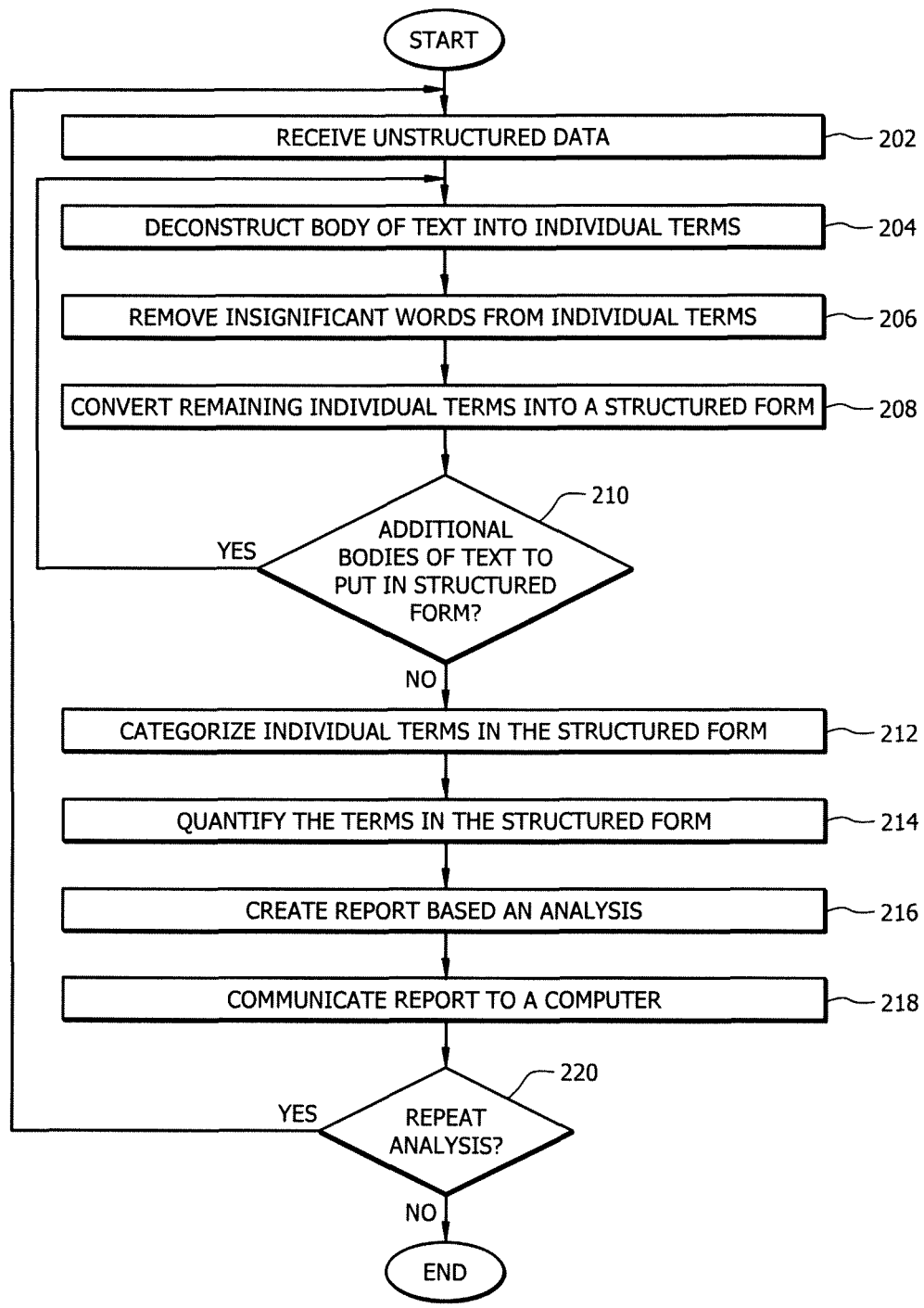
FIG. 2 illustrates an example flowchart that analyzes risk using unstructured data.

Embodiments of the present invention and its advantages are best understood by referring to FIGS. 1 through 2 of the drawings, like numerals being used for like and corresponding parts of the various drawings.

Organizations evaluate and manage operational risk as part of the organization's functions. To evaluate and manage that risk, organizations may employ various processes to gather information and evaluate the information that impacts the organization's risk. The information gathered from various sources may be in an unstructured form. Unstructured data represents data that has no easily identifiable structure or consistent and recurring patterns. It is difficult for a reader to understand and summarize a lot of information in a reasonable amount of time. Unstructured data may include substantial text, which results in irregularities and ambiguities that make it difficult for a computer to understand. Therefore, it is advantageous to provide a system and method that employs text mining techniques on bodies of unstructured text to determine patterns of risks, identify emerging risks, and compare external risk data to internal risk data.

FIG. 1 illustrates a block diagram of a system for analyzing risk using unstructured data. System 10 includes computers 12, data sources 18, a competitor database 20, a vendor database 22, and a marketing database 24 that communicate over one or more networks 16 with risk analysis module 26 to facilitate the structuring of unstructured data. The unstructured data is structured to determine patterns of risk, identify emerging risks, and compare external risk data to internal risk data.

In the illustrated embodiment, organization 11 comprises computers 12, competitor database 20, vendor database 22, marketing database 24, and risk analysis module 26. Organization 11 represents an entity in any suitable industry that manages risk. Organization 11 may include companies of any suitable size that evaluate operational risk to manage and identify risk of the organization. Third parties may include any suitable entity that is external to organization 11, such as vendors of organization 11, competitors of organization 11, or entities in industries different from organization 11.

System 10 includes computers 12a-12n, where n represents any suitable number, that communicate with risk analysis module 26 through network 16. For example, computer 12a communicates with risk analysis module 26 to identify the sources from which to retrieve unstructured data. As another example, computer 12 receives quantified and structured data from risk analysis module 26 in a graphical format. In the illustrated embodiment, risk managers, associates, employees, or other suitable individuals in the organization use computer 12. Computer 12 may include a personal computer, a workstation, a laptop, a wireless or cellular telephone, an electronic notebook, a personal digital assistant, a smartphone, a netbook, a tablet, a slate personal computer, or any other device (wireless, wireline, or otherwise) capable of receiving, processing, storing, and/or communicating information with other components of system 10. Computer 12 may also comprise a user interface, such as a display, keyboard, mouse, or other appropriate terminal equipment.

In the illustrated embodiment, computer 12 includes a graphical user interface ("GUI") 14 that displays information received from risk analysis module 26. For example, GUI 14 may display analyzed external data in a particular format to a user of computer 12. GUI 14 is generally operable to tailor and filter data entered by and presented to the user. GUI 14 may provide the user with an efficient and user-friendly presentation of information using a plurality of displays having interactive fields, pull-down lists, and buttons operated by the user. GUI 14 may include multiple levels of abstraction including groupings and boundaries. It should be understood that the term GUI 14 may be used in the singular or in the plural to describe one or more GUIs 14 in each of the displays of a particular GUI 14.

Network 16 represents any suitable network operable to facilitate communication between the components of system 10, such as computers 12, data sources 18, competitor database 20, vendor database 22, marketing database 24, and risk analysis module 26. Network 16 may include any interconnecting system capable of transmitting audio, video, signals, data, messages, or any combination of the preceding. Network 16 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Data sources 18 represent components that are external to organization 11 that provide unstructured data associated with organization 11 and/or third parties to risk analysis module 26. Data sources 18 may provide unbiased, independent information for analysis. For example, data source 18 may include regulatory filings associated with third parties or organization 11, such as filings made with the Security Exchange Commission (e.g., 10Ks and 10Qs). Data sources 18 may also include press releases, news, events, subscription-based information, or any other digital media that may be related to organization 11 or a third party. Additionally, data sources 18 may include independent professional research materials. Data sources 18 may be scanned for targeted, repeatable information.

Data sources 18 may include a network server, any suitable remote server, a mainframe, a host computer, a workstation, a web server, a personal computer, a file server, or any other suitable device operable to communicate with other components in system 10 and process data. In some embodiments, data source 18 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of data source 18 may be performed by any suitable combination of one or more servers or other components at one or more locations. In the embodiment where the module is a server, the server may be a private server, and the server may be a virtual or physical server. Also, data source 18 may include any suitable component that functions as a server.

Competitor database 20 stores, either permanently or temporarily, information associated with competitors of organization 11. Competitor database 20 is within organization 11 and represents information that organization 11 compiles associated with its competitors. The information stored in competitor database 20 may include, but is not limited to, press releases, regulatory filing information, professional research materials, or other suitable competitor analysis information. Risk analysis module 26 may communicate with competitor database 20 to receive information associated with competitors of organization 11. Competitor database 20 includes any one or a combination of volatile or non-volatile local or remote devices suitable for storing information. For example, competitor database 20 may include Random Access Memory (RAM), Read Only Memory (ROM), magnetic storage devices, optical storage devices, or any other suitable information storage device or combination of these devices.

Vendor database 22 stores, either permanently or temporarily, information associated with vendors of organization 11. Vendor database 22 is within organization 11 and represents information that organization 11 compiles associated with its vendors. The information stored in vendor database 22 may include, but is not limited to, press releases, regulatory filing information, professional research materials, performance information, relationship information, financial data, or other suitable vendor analysis information. Risk analysis module 26 may communicate with vendor database 22 to receive information associated with vendors of organization 11. Vendor database 22 includes any one or a combination of volatile or non-volatile local or remote devices suitable for storing information. For example, vendor database 22 may include RAM, ROM, magnetic storage devices, optical storage devices, or any other suitable information storage device or combination of these devices.

Marketing database 24 stores, either permanently or temporarily, information associated with organization 11 or other third parties. Marketing database 24 is within organization 11 and represents information that organization 11 compiles regarding itself and third parties. For example, marketing database 24 stores information on third parties that are not vendors or competitors. The information stored in marketing database 24 may include, but is not limited to, press releases, regulatory filing information, professional research materials, or other suitable marketing information. Risk analysis module 26 may communicate with marketing database 24 to receive information associated with organization 11. Marketing database 24 includes any one or a combination of volatile or non-volatile local or remote devices suitable for storing information. For example, marketing database 24 may include RAM, ROM, magnetic storage devices, optical storage devices, or any other suitable information storage device or combination of these devices.

Risk analysis module 26 represents any suitable component that facilitates the analysis of unstructured data to identify external and internal risks. Risk analysis module 26 receives data from data sources 18, competitor database 20, vendor database 22, and/or marketing database 24 and analyzes the received data to identify risks or emerging risks of organization 11. In an embodiment, risk analysis module 26 receives unstructured data from the various sources to analyze. Additionally, risk analysis module 26 may create reports based on the analysis, and may communicate the reports to computer 12.

Risk analysis module 26 may include a network server, any suitable remote server, a mainframe, a host computer, a workstation, a web server, a personal computer, a file server, or any other suitable device operable to communicate with computers 12, data sources 18, competitor database 20, vendor database 22, and/or marketing database 24. In some embodiments, risk analysis module 26 may execute any suitable operating system such as IBM's zSeries/Operating System (z/OS), MS-DOS, PC-DOS, MAC-OS, WINDOWS, UNIX, OpenVMS, or any other appropriate operating system, including future operating systems. The functions of risk analysis module 26 may be performed by any suitable combination of one or more servers or other components at one or more locations. In the embodiment where risk analysis module 26 is a server, the server may be a private server, or the server may be a virtual or physical server. The server may include one or more servers at the same or remote locations. Also, risk analysis module 26 may include any suitable component that functions as a server. In the illustrated embodiment, risk analysis module 26 includes a network interface 28, a processor 30, and a memory 32.

Network interface 28 represents any suitable device operable to receive information from network 16, transmit information through network 16, perform processing of information, communicate with other devices, or any combination of the preceding. For example, network interface 28 receives competitor information from competitor database 20. As another example, network interface 28 receives information external to organization 11 from data sources 18. As yet another example, network interface 28 may communicate reports based on the analysis of the received data to computers 12. Network interface 28 represents any port or connection, real or virtual, including any suitable hardware and/or software, including protocol conversion and data processing capabilities, to communicate through a LAN, WAN, MAN, or other communication system that allows risk analysis module 26 to exchange information with network 16, data sources 18, competitor database 20, vendor database 22, marketing database 24, or other components of system 10.

Processor 30 communicatively couples to network interface 28 and memory 32, and controls the operation and administration of risk analysis module 26 by processing information received from network interface 28 and memory 32. Processor 30 includes any hardware and/or software that operates to control and process information. For example, processor 30 executes analysis rules 34 to control the operation of risk analysis module 26. Processor 30 may be a programmable logic device, a microcontroller, a microprocessor, any suitable processing device, or any suitable combination of the preceding.

Memory 32 stores, either permanently or temporarily, data, operational software, or other information for processor 30. Memory 32 includes any one or a combination of volatile or non-volatile local or remote devices suitable for storing information. For example, memory 32 may include RAM, ROM, magnetic storage devices, optical storage devices, or any other suitable information storage device or a combination of these devices. While illustrated as including particular modules, memory 32 may include any suitable information for use in the operation or risk analysis module 26. In the illustrated embodiment, memory 32 includes analysis rules 34 and vectors 36.

Analysis rules 34 generally refer to logic, rules, algorithms, code, tables, and/or other suitable instructions embodied in a computer-readable storage medium for performing the described functions and operations of risk analysis module 26. For example, analysis rules 34 facilitate the analysis of data received by risk analysis module 26. In an embodiment, analysis rules 34 facilitate the decomposition of unstructured data into a structured form. Additionally, rules 34 may facilitate categorizing the data in the structured form and quantifying the data in the structured form.

Vectors 36 generally refer to the structured form of the retrieved, unstructured data. Vectors 36 may represent bodies of text that have been converted into a list of terms. For example, each paragraph in an article may be converted into a list of terms. Therefore, if the article includes ten paragraphs, there will be ten vectors 36 stored in risk analysis module 26. As another example, each article, press release, or other suitable compilation of information may be converted into a list of terms and the list of terms from the compilation is converted into a vector 36. Therefore, each article, press release, or other suitable body of text is associated with a vector 36.

Additionally, each term in the list of terms may be quantified using any suitable technique. For example, each term in the list of terms may be associated with a number that represents the number of times the term appears in the body of text. For example, if a paragraph includes the term "risk" in it five times, vector 36 associated with that paragraph will include "risk" and the number "5" by the term. As another example, risk analysis module 26 may quantify the terms based on expert opinion or structured data. Terms may also be quantified based on their association with a materialized risk. For example, if a risk has materialized, then risk analysis module 26 determines the text associated with that materialized risk, and scores the text based on the association.

In an exemplary embodiment of operation, risk analysis module 26 receives data that is internal to organization 11, data that is external to organization 11, and data that is internal and external to organization 11. After receiving the data to analyze, risk analysis module 26 deconstructs a plurality of bodies of text into individual terms. Risk analysis module 26 converts the individual terms into a structured form. Once in the structured form, risk analysis module 26 categorizes individual terms and quantifies the individual terms. Upon completion of the analysis, risk analysis module 26 creates a report based on the analysis and communicates the report to computers 12 for further use within organization 11.

A component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to system 10 without departing from the scope of the invention. For example, system 10 may include any number of computers 12, data sources 18, competitor databases 20, vendor databases 22, marketing databases 24, and risk analysis modules 26. As another example, organization 11 may include an organization credit risk database, which includes information regarding risk factors that organization 11 has in different countries. Any suitable logic may perform the functions of system 10 and the components within system 10.

FIG. 2 illustrates an example flowchart that analyzes risk using unstructured data. At step 202, risk analysis module 26 receives unstructured data. Risk analysis module 26 may receive data internal to organization 11 from competitor database 20, vendor database 22, and/or marketing database 24. Risk analysis module 26 may receive data external to organization 11 from data sources 18. In an embodiment, the internal and external data may include unstructured data regarding organization 11 and/or third parties.

For example, if risk analysis module 26 receives unstructured data related to competitors, the analyzed data may provide insight to the risk landscape faced by competitors in a summarized fashion. As another example, risk analysis module 26 receives unstructured data internal to organization 11, but related to various business units or lines of business within organization 11. In this embodiment, risk analysis module 26 may receive text related to documented issues, emerging risks and risk, meeting minutes, newsletters, or other suitable internal data. Receiving data internal to organization 11, but from varying parts of organization 11, facilitates a comparison of documented issues internal to organization 11 to identify trends or patterns. As yet another example, risk analysis module 26 receives unstructured data related to third parties and related to organization 11, which may facilitate an analysis of emerging risks that have not materialized for organization 11. Therefore, organization 11 may identify a risk event that materialized at a third party that aligns to documented issues at organization 11, and mitigate that risk before it materializes for organization 11.

At step 204, risk analysis module 26 deconstructs the bodies of text from the unstructured data into individual terms. A body of text may include any suitable division of the unstructured data. For example, a body of text may include a paragraph within the unstructured data. At step 206, risk analysis module 26 removes insignificant words from the individual terms. For example, insignificant words may include common words, such as "the," "a," "an," and other common words. Insignificant words may also include words that do not have a significant meaning for risk analysis. For example, the word "average" may be removed because it does not have particular significance in the risk context, but the word "large" may remain in the group of individual terms, which may identify a large loss, a large amount, or another significant piece of information in the risk context.

Risk analysis module 26 converts the remaining individual terms into a structured form in step 208. The structured form may include any suitable form that facilitates the organization of the individual terms, such as a vector, a list, or a column. When the individual terms are converted into a structured form, risk analysis module 26 may count the number of instances of each term in the body of text. For example, if a paragraph includes the term "risk" in it five times, vector 36 associated with that paragraph will include "risk" and the number "5" by the term. As another example, risk analysis module 26 may quantify the terms based on expert opinion or structured data. Terms may also be quantified based on their association with a materialized risk. For example, if a risk has materialized, then risk analysis module 26 determines the text associated with that materialized risk, and scores the text based on the association.

At step 210, risk analysis module 26 determines whether additional bodies of text from the received data need to put in structured form. If there is additional data to deconstruct and convert into structured form, the method returns to step 204. If the received data has been deconstructed and converted, the method proceeds from step 212.

At step 212, risk analysis module 26 categorizes the individual terms included in the structured form. For example, risk analysis module 26 links the terms to specific categories. These categories may include, but are not limited to, the following: organization name, geographical region, size of organization, number of employees, number of countries represented, public organization, private organization, regulatory body, industry, fine amount, or any other suitable category. In an embodiment, risk analysis module 26 may recommend additional categories in which the individual terms may be categorized. When categorizing the individual terms, risk analysis module 26 may use any suitable algorithm to compare the data between a plurality of structured forms, such as a Bayesian inference. For example, risk analysis module 26 compares a plurality of structured forms to identify clusters or groups of structured forms that represent groups of similar terms. In an embodiment, risk analysis module 26 may determine the size of each cluster, which may facilitate additional review of the data, as described below with respect to step 218.

At step 214, risk analysis module 26 quantifies the terms included in the structured form. For example, risk analysis module 26 weights each term in the structured form. In an embodiment, the weighting of the terms is predefined by an administrator. In another embodiment, risk analysis module 26 may learn the significance of terms during the implementation of the method, and may determine the appropriate weighting for the terms based on past information. Additionally, risk analysis module 26 may link the terms to quantifiable data when quantifying the terms. To link a term to quantifiable data, risk analysis module 26 determines which terms have associated quantifiable data and then links the terms to the quantifiable data. For example, a term may be categorized as "fine amount" and may have quantifiable data associated with that term. Furthermore, risk analysis module 26 may link the individual terms to a third party, such as a competitor of an organization. By linking individual terms to a third party, risk analysis module 26 may summarize the data associated with the third party.

Now that the data has been converted into a structured form, categorized, and quantified, risk analysis module 26 may create a report in step 216 with the analyzed data. The report may take any suitable form that presents the information in a graphical and/or numerical form. For example, the report may include a heat map, a bar chart, or other suitable representation. This report is communicated to computers 12 in step 218 and used in various instances. For example, the reports may be analyzed to determine specific risks that need additional review. In an embodiment, risk analysis module 26 may identify a plurality of risks that are quantified as low that may need additional review. In this embodiment, risk analysis module 26 includes criteria to determine whether a plurality of low-risk issues meet a particular threshold to trigger additional review and communicates that information in the report. In another embodiment, risk analysis module 26 may identify high risk issues for additional review. In this embodiment, the single high risk issue meets a particular threshold to trigger additional review and communicates that information in the report.

At step 220, risk analysis module 26 determines whether to repeat the analysis. Risk analysis module 26 may repeat the analysis at different points in time to identify trends, forecast potential risks, and/or compare external risks to internal risks. If the process begins again, the method continues from step 202, otherwise the method ends. Risk analysis module 26 may receive information from the various data sources continuously, and may implement the analysis process on a predetermined schedule. For example, risk analysis module 26 may perform the analysis on a quarterly basis, on a monthly basis, on a weekly basis, or during any predetermined time period.

Modifications, additions, or omissions may be made to method 200 depicted in FIG. 2. The method may include more, fewer, or other steps. For example, risk analysis module 26 may determine synonyms for the individual terms in the structured form and may use the synonyms to make the terms more consistent across a plurality of structured forms. Additionally, steps may be performed in parallel or in any suitable order. While discussed as risk analysis module 26 performing the steps, any suitable component of system 10 may perform one or more steps of the method.

Certain embodiments of the present disclosure may provide one or more technical advantages. A technical advantage of one embodiment includes extracting, analyzing, and summarizing useful information from various, unstructured sources to manage operational risks. Another technical advantage of an embodiment includes transforming unstructured data into a structured form to determine risk. Yet another technical advantage of an embodiment includes identifying and aggregating risks across an organization to manage.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
a network interface operable to receive unstructured data from a plurality of data sources, the plurality of data sources comprising a competitor database, a vendor database, and a marketing database, wherein the unstructured data relates to a financial risk of an organization and comprises a plurality of text documents, each text document comprising a plurality of groups of words;
a processor communicatively coupled to the network interface and operable to:
deconstruct each group of words from the unstructured data into individual words;
convert the individual words from each group of words into a plurality of structured forms, each structured form corresponding to a single group of words;
determine a numerical value associated with each individual word according to: a number of times the individual word appears in the group of words and an association of the group of words with a risk experienced by an organization, wherein each structured form is a vector that includes each individual word and the numerical value associated with the individual word;
compare each structured form to another structured form using a Bayesian inference;
categorize the individual words in each structured form into at least one category according to the comparison and the at least one category is selected from a set of categories consisting of organization name, geographical region, organization size, number of employees, number of countries represented, public organization, private organization, regulatory body, industry, and fine amount, the categories indicating the financial risk of the organization; and
quantify the individual words in each structured form according to at least the categorization of the individual words by weighting each individual word.

2. The system of claim 1, wherein the processor is further operable to remove insignificant words from each group of words before converting the individual words into the structured form.

3. The system of claim 1, wherein:
the processor is further operable to create a report based on the categorized and quantified individual words; and
the network interface is further operable to communicate the report to a computer to facilitate analysis of the individual words and the associated group of words.

4. The system of claim 1, wherein the network interface is further operable to receive the unstructured data from at least one of an external data source and an internal data source.

5. The system of claim 1, wherein the processor is further operable to:
determine whether individual words have associated quantifiable data; and
link the individual words to quantifiable data.

6. The system of claim 1, wherein the processor is further operable to:
compare a first structured form to a second structured form;
identify similar text between the first structured form and the second structured form to determine a similar text group; and
determine a size of the similar text group.

7. Non-transitory computer readable medium comprising logic, the logic, when executed by a processor, operable to:
receive unstructured data from a plurality of data sources, the plurality of data sources comprising a competitor database, a vendor database, and a marketing database, wherein the unstructured data relates to a financial risk of an organization and comprises a plurality of text documents, each text document comprising a plurality of groups of words;
deconstruct each group of words from the unstructured data into individual words;
convert the individual words from each group of words into a plurality of structured forms, each structured form corresponding to a single group of words;
determine a numerical value associated with each individual word according to: a number of times the individual word appears in the group of words and an association of the group of words with a risk experienced by an organization, wherein each structured form is a vector that includes each individual word and the numerical value associated with the individual word;
compare each structured form to another structured form using a Bayesian inference;
categorize the individual words in each structured form into at least one category according to the comparison and the at least one category is selected from a set of categories consisting of organization name, geographical region, organization size, number of employees, number of countries represented, public organization, private organization, regulatory body, industry, and fine amount, the categories indicating the financial risk of the organization; and
quantify the individual words in each structured form according to at least the categorization of the individual words by weighting each individual word.

8. The computer readable medium of claim 7, wherein the logic is further operable to remove insignificant words from each group of words before converting the individual words into the structured form.

9. The computer readable medium of claim 7, wherein the logic is further operable to:
create a report based on the categorized and quantified individual words; and
communicate the report to a computer to facilitate analysis of the individual words and the associated group of words.

10. The computer readable medium of claim 7, wherein the logic is further operable to:
determine whether individual words have associated quantifiable data; and
link the individual words to quantifiable data.

11. The computer readable medium of claim 7, wherein the logic is further operable to:
compare a first structured form to a second structured form;
identify similar text between the first structured form and the second structured form to determine a similar text group; and
determine a size of the similar text group.

12. A method, comprising:
receiving unstructured data from a plurality of data sources, the plurality of data sources comprising a competitor database, a vendor database, and a marketing database, wherein the unstructured data relates to a financial risk of an organization and comprises a plurality of text documents, each text document comprising a plurality of groups of words;

deconstructing, by a processor, each group of words from the unstructured data into individual words;

converting, by the processor, the individual words from each group of words into a plurality of structured forms, each structured form corresponding to a single group of words;

determining, by the processor, a numerical value associated with each individual word according to: a number of times the individual word appears in the group of words and an association of the group of words with a risk experienced by an organization, wherein each structured form is a vector that includes each individual word and a quantification of the individual word;

comparing, by the processor, each structured form to another structured form using a Bayesian inference;

categorizing, by the processor, the individual words in each structured form into at least one category according to the comparison and the at least one category is selected from a set of categories consisting of organization name, geographical region, organization size, number of employees, number of countries represented, public organization, private organization, regulatory body, industry, and fine amount, the categories indicating the financial risk of the organization; and quantifying, by the processor, the individual words in each structured form according to at least the categorization of the individual words by weighting each individual word.

13. The method of claim 12, further comprising removing insignificant words from each group of words before converting the individual words into the structured form.

14. The method of claim 12, further comprising:
creating a report based on the categorized and quantified individual words; and
communicating the report to a computer to facilitate analysis of the individual words and the associated group of words.

15. The method of claim 12, wherein receiving the unstructured data from the plurality of sources comprises receiving the unstructured data from at least one of an external data source and an internal data source.

16. The method of claim 12, wherein quantifying the individual words comprises weighting the individual words based on quantifiable data.

17. The method of claim 12, wherein quantifying the individual words comprises:
determining whether individual words have associated quantifiable data; and
linking the individual words to quantifiable data.

18. The method of claim 12, further comprising:
comparing a first structured form to a second structured form;
identifying similar text between the first structured form and the second structured form to determine a similar text group; and
determining a size of the similar text group.

19. The method of claim 12, wherein each individual term in the structured form is associated with a number that indicates the number of times the individual word appears in the group of words.

* * * * *